United States Patent [19]
Schabert et al.

[11] Patent Number: 5,914,200
[45] Date of Patent: *Jun. 22, 1999

[54] HIGH-TEMPERATURE FUEL CELL STACK ARRANGEMENT WITH CENTRALLY LOCATED EXIT AIR SPACE

[75] Inventors: Hans-Peter Schabert; Wolfgang Drenckhahn, both of Erlangen; Horst Vollmar, Herzogenaurach, all of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/572,662

[22] Filed: Dec. 14, 1995

Related U.S. Application Data

[63] Continuation of application No. PCT/DE94/00618, Jun. 1, 1994.

[30] Foreign Application Priority Data

Jun. 14, 1993 [DE] Germany ............................. 43 19 411

[51] Int. Cl.[6] ...................................................... H01M 2/00
[52] U.S. Cl. .................................. 429/34; 429/38; 429/39
[58] Field of Search .................................. 429/34, 35, 36, 429/38, 39

[56] References Cited

U.S. PATENT DOCUMENTS

| 3,331,704 | 7/1967 | Vickers et al. | 136/86 |
|---|---|---|---|
| 4,041,210 | 8/1977 | Van Dine | 429/16 |
| 4,176,213 | 11/1979 | Van Linden | 429/12 |
| 4,202,933 | 5/1980 | Reiser et al. | 429/13 |
| 4,212,929 | 7/1980 | Grevstad et al. | 429/37 |
| 4,233,914 | 11/1980 | Schuette et al. | 110/233 |
| 4,342,816 | 8/1982 | Kothmann et al. | 429/38 |

(List continued on next page.)

FOREIGN PATENT DOCUMENTS

| 0 338 823 | 10/1989 | European Pat. Off. . |
|---|---|---|
| 0 398 111 | 11/1990 | European Pat. Off. . |
| 39 18 115 | 12/1990 | Germany . |
| 60-235365 | 11/1985 | Japan . |
| 61-259461 | 11/1986 | Japan . |
| 5-41239 | 6/1993 | Japan . |

OTHER PUBLICATIONS

Patent Abstracts of Japan No. JP 4–056075 (Hitoshi et al.), Jun. 10, 1992.
Patent Abstracts of Japan No. JP 4–357673 (Akitoshi) May 7, 1993.
Publ.1046b Extended Abstracts No. 1093, May 1993, (Shisotsu et al.)pp. 1580–1581, "Current Status of . . . ".
Publ. Fuel Cell Handbook 1989, pp. 440–454. no month available.

(List continued on next page.)

Primary Examiner—Arun S. Phasge
Assistant Examiner—Thomas H. Parsons
Attorney, Agent, or Firm—Herbert L. Lerner; Laurence A. Greenberg

[57] ABSTRACT

A high-temperature fuel cell system having a particularly simple construction and a particularly low power requirement for a compressor on the air side, includes at least one high-temperature fuel cell stack being disposed in a container and forming a partition or part of a partition separating an air entry space into which air inlets of high-temperature fuel cells open, and an air exit space into which air outlets of the high-temperature fuel cells open, from one another in gas-tight fashion in the container. Preferably, at least one location in the partition is provided at which the air situated in the air exit space can be recirculated at least partially into the air entry space through the use of air flowing into the air entry space. The effect achieved thereby is that the compressor compresses cold, relatively dense air and a recirculation of hot air in the container can be carried out without the use of moving parts.

10 Claims, 6 Drawing Sheets

U.S. PATENT DOCUMENTS

| | | | |
|---|---|---|---|
| 4,362,789 | 12/1982 | Dighe | 429/34 |
| 4,650,727 | 3/1987 | Vanderborgh et al. | 429/19 |
| 4,713,303 | 12/1987 | Farooque et al. | 429/34 |
| 5,079,105 | 1/1992 | Bossel | 429/19 |
| 5,270,131 | 12/1993 | Diethelm | 429/34 |

OTHER PUBLICATIONS

Publ. VGB Kraftwerkstechnik Apr. 1991, pp. 332–335, "Technische und wirtschaftliche Aspekte des . . . ".

Publ. Fuji Electric Review No. 2 vol. 38, p. 58, "Main Components". No date available.

Publ. MBB Handelsblatt Jun. 1990, 2 pages.

HIGH-TEMPERATURE FUEL CELL STACK ARRANGEMENT WITH CENTRALLY LOCATED EXIT AIR SPACE

CROSS-REFERENCE TO RELATED APPLICATION

This application is a Continuation of International Application Serial No. PCT/DE94/00618, filed Jun. 1, 1994.

BACKGROUND OF THE INVENTION

Field of the Invention

The invention relates to a high-temperature fuel cell system having a container and having at least one high-temperature fuel cell stack disposed in the container.

A fuel cell stack includes a plurality of planar solid-electrolyte, high-temperature fuel cells, that are fixed on one another and electrically connected in series. In this case one respective bipolar plate is built in between directly neighboring cells. The plate electrically conductively connects the cathode of one cell to the anode of the neighboring cell, it guarantees gas distribution and it represents a supporting structural element.

A process which essentially represents a reversal of the electrolysis takes place in the fuel cell. The reaction partners of the combustion reaction, namely the fuel which is generally hydrogen, and the oxygen carrier which is generally air, are supplied separately. In a high-temperature fuel cell, the supply lines carrying fuel and oxygen are separated from one another in gas-tight fashion by a ceramic solid electrolyte which is provided with electrodes on both sides. During operation, electrons are given out at the electrode on the fuel side of the solid electrolyte, namely the anode, and electrons are received at the electrode on the oxygen side of the solid electrolyte, namely the cathode. A potential difference, the open-circuit voltage, is set up at the two electrodes of the solid electrolyte. The solid electrolyte serves the function of separating the reactants, of transporting the charges in the form of ions and of simultaneously preventing an electronic short-circuit between the two electrodes of the solid electrolyte. For this purpose, it must have a low electronic conductivity together with a high ionic conductivity.

As a result of the relatively high operating temperature (it is in the range from 800° to 1100° C.), such high-temperature fuel cells are suitable for converting hydrocarbons such as natural gas or propane that is storable in liquid form, for example, in addition to hydrogen gas, in contrast to low-temperature fuel cells. High power densities can be reached on the order of magnitude of the range of many hundreds of mW per $cm^2$ of cell surface area, with high-temperature fuel cells. The individual high-temperature fuel cell produces an open-circuit voltage of somewhat more than one volt. Further details regarding high-temperature fuel cells can be found in the "Fuel Cell Handbook" by Appleby and Foulkes, New York, 1989.

Information regarding the way in which high-temperature fuel cells can be used, for example in combined heat and power plants, can also be found in an article entitled "Technische und wirtschaftliche Aspekte des Brennstoffzellen-Einsatzes in Kraft-Wärme-Kopplungs-Anlagen" [Technical and Economic Aspects of Fuel Cell use in Combined Heat and Power Plants] by Drenckhahn, Lezuo and Reiter in VGB Kraftwerkstechnik, Volume 71, 1991, Issue 4.

In a high-temperature fuel cell system, one or more stacks of high-temperature fuel cells are usually built into a container. The fuel and the oxygen carrier, usually air, are supplied in heated and slightly compressed form through external supply lines to the respective anodes and cathodes of the high-temperature fuel cells. In this case the fuel supply is usually constructed in such a way that approximately 80% of the fuel is consumed in the high-temperature fuel cells and the remaining 20% of the fuel is discharged together with the product water formed from hydrogen and oxygen ions in the reaction through pipelines. On the fuel side, the gas mixture discharged from the high-temperature fuel cells is not recirculated but instead is catalytically post-combusted, with the liberated energy being used to preheat the reactants and/or to produce steam.

On the cathode side the air volume flow is greater by approximately a factor of 8 as compared to the fuel volume flow. In order to not lose, or to only partially lose the heat content of the exit-air mixture leaving the high-temperature fuel cells in the container, it is customary to discharge the exit-air mixture on the cathode side from the container at least partially through pipelines, to recompress it and to feed it back again into the container through supply lines. In that case, however, a series of disadvantages occur: in the case of the heretofore known so-called "mono-block structure" (see Fuji Electric Review, Vol. 38, No. 2, page 58, and MBB in "Handelsblatt" of Jun. 12, 1990), very large pressure drops are produced on the distributor side and the manifold side, which is to say in the fuel-cell inlets or outlets on the air side, and those pressure drops can only be compensated for with a compressor having a relatively high power demand. Those pressure drops are usually above approximately 50 mbar.

In particular in the case of high total electrical powers of the high-temperature fuel cell system it is easy to recognize that considerable problems exist on the cathode side due to the multiplicity of supply lines and discharge lines and due to the gas compressor. The gas compressor must compress a hot, oxygen-containing exit gas on the cathode side, which causes particularly high maintenance expenditure, especially for the moving parts of the compressor. In order to avoid that disadvantage, German Published, Non-Prosecuted Application DE 40 21 097 A1 discloses first cooling the exit gas on the cathode side to below approximately 650° C., and then compressing and subsequently reheating it. Disadvantageously, that configuration requires the use of additional heat exchangers and the introduction of additional quantities of heat. In addition the flexurally non-rigid routing and the fitting together of the multiplicity of individual pipes on the supply and discharge sides of the cathodes are difficult.

SUMMARY OF THE INVENTION

It is accordingly an object of the invention to provide a high-temperature fuel cell system, which overcomes the hereinafore-mentioned disadvantages of the heretofore-known devices of this general type and in which fuel and oxygen carriers are guided with a particularly low pressure drop in the high-temperature fuel cell system.

With the foregoing and other objects in view there is provided, in accordance with the invention, a high-temperature fuel cell system, comprising a container having an air entry space and an air exit space; at least one high-temperature fuel cell stack in the container being a partition or forming at least part of a partition separating the air entry space and the air exit space from one another in the container, the high-temperature fuel cell stack including high-temperature fuel cells having air inlets opening into the air entry space and air outlets opening into the air exit space;

and the partition having at least one location for at least partially recirculating air in the air exit space into the air entry space with air flowing into the air entry space.

The result of this is that, on the cathode side, the oxygen carrier, which is usually air, is introduced into only one space, namely the air entry space, and is discharged from only one space, namely the air exit space. This leads to a particularly low pressure drop when distributing and collecting the oxygen carrier.

As mentioned above, at least one location is provided in the partition at which the air situated in the air exit space can be recirculated at least partially into the air entry space through the use of the air flowing into the air entry space. The result of this is that the air flowing out from the high-temperature fuel cells is guided into the air exit space in common to all of the air outlets and (without the heretofore customary extraction from the container with subsequent compression outside the container) is at least partially fed back into the air entry space. In this case the hot air situated in the air exit space is at least partially recirculated through the use of the flow movement of the somewhat cooler air flowing into the air entry space, as a result of which the air flowing into the air inlets of the high-temperature fuel cells already approximately has a preferred temperature for operating the high-temperature fuel cells.

In accordance with another feature of the invention, a plurality of the high-temperature fuel cell stacks are disposed directly next to one another in a ring. In this case, "in a ring" also means that a plurality of stacks may be disposed in the form of a polygon. In this way the air entry space and the air outlet space in the container are particularly easy to separate. In this case the so-called central space enclosed by the high-temperature fuel cell stacks can be the air exit space and accordingly, the so-called ring space lying outside the ring of the high-temperature fuel cell stacks can be the air entry space, and vice versa.

In accordance with a further feature of the invention, there are provided labyrinth baffles or chicanes being used for partitioning and/or sealing, since the pressure drop in the case of the high-temperature fuel cell system configuration according to the invention is only relatively low on the air side. In this way the air entry space can be easily sealed off and separated from the air exit space, even between the high-temperature fuel cell stacks disposed in a ring.

In accordance with an added feature of the invention, there is provided an air jet pump (ejector) for recirculating the air situated in the air exit space, which can be used as a particularly simple air-recirculator that requires no maintenance.

In accordance with a concomitant feature of the invention, air which is compressed in the cold state and subsequently preheated is fed to the air jet pump, which results in a particularly low power demand for the air compressor, because the compressor compresses relatively cold air with relatively high density, before the air is preheated, which leads to a decrease in the air density, as is known.

Other features which are considered as characteristic for the invention are set forth in the appended claims.

Although the invention is illustrated and described herein as embodied in a high-temperature fuel cell system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
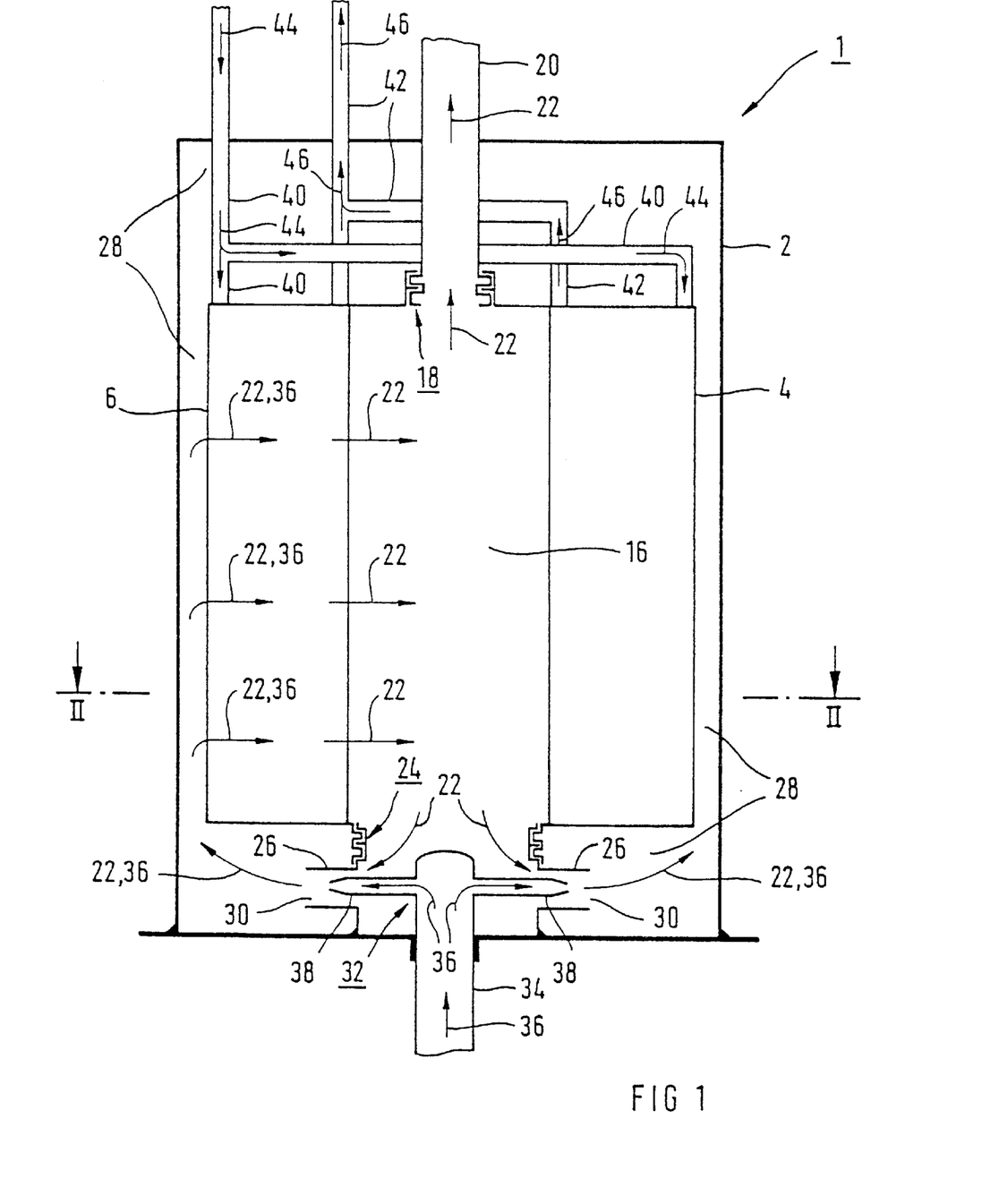
FIG. 1 is a fragmentary, diagrammatic, longitudinal-sectional view of a high-temperature fuel cell system.
Figure 2:
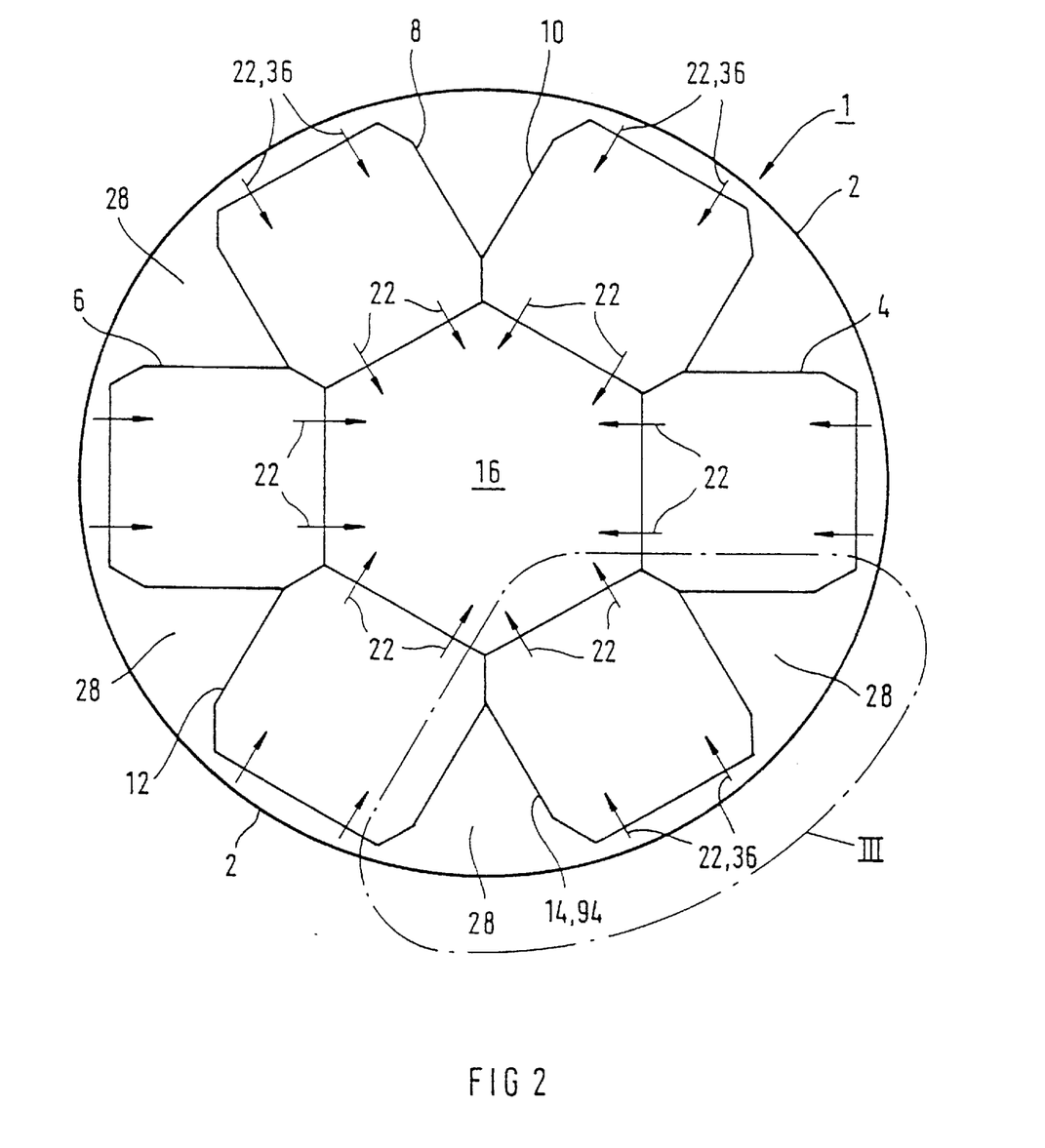
FIG. 2 is a cross-sectional view of the high-temperature fuel cell system which is taken along the line II—II according to FIG. 1, in the direction of the arrows.

Referring now in detail to the figures of the drawings, in which the same parts have the same reference numerals, and first, particularly, to FIG. 1 thereof, there is seen a longitudinal section through a high-temperature fuel cell system 1. As is best seen in FIG. 2, in this system 1, six high-temperature fuel cell stacks 4 to 14 are disposed directly adjoining one another in a ring, inside a cylindrical reactor container 2. Each high-temperature fuel cell stack 4 to 14 is formed of 416 planes with 20 high-temperature fuel cells in each plane, so that with an average power of approximately 2 Watts per fuel cell and with 49,920 fuel cells, the result is an average electrical power of the high-temperature fuel cell system 1 that is equal to approximately 100 kW. In this exemplary embodiment, an air exit space which is a so-called central space 16, is separated from and sealed off from an air entry space which is a so-called annular space 28. The central space 16 is separated from and sealed off the annular space 28 by the fuel cell stacks 4 to 14 that are disposed in a ring, by an exit air pipe 20 which carries cathode side exit air 22 and is provided with labyrinth baffles or chicanes 18 and by other labyrinth baffles 24 and flow guide pipes 26. Openings 30 are stamped out of the flow guide pipes 26. An air jet pump 32 to which preheated compressed air 36 is supplied through an air supply line 34, is disposed centrally in the central space 16, below the high-temperature fuel cell stacks 4 to 14. In this case nozzles of air supply tubes 38 of the air jet pump 32 project into the flow guide pipes 26 which serve as suction tubes.

In each case, one fuel supply line 40 and one exit gas line 42 are connected to each stack 4 to 14 in an upper part of the high-temperature fuel cell stacks 4 to 14. A gas mixture 44 being formed of previously compressed and heated hydrogen gas obtained from the reformation of natural gas, still unreformed natural gas and water, is fed through the fuel supply line 40 to the stacks 4 to 14. An exit gas 46 flowing out of the stacks 4 to 14 and being formed of unconsumed hydrogen gas and product water formed in the combustion reaction, is discharged through the exit gas line 42.

During operation of the high-temperature fuel cell system 1 with a power of approximately 100 kW that is selected in the exemplary embodiment, air 36 which is heated to approximately 700° C. is supplied through the air supply line 34 with a mass flow of approximately 60 g per second, which corresponds to a volume flow of approximately 210 liters per second. Through the use of the air jet pump 32, the air 36 is injected into the annular space 28 through the air supply tubes 38. In this case the air 36 that is injected into the annular space 28 draws with it a part of the air 22 which is situated in the central space 16 and is at a temperature of approximately 1000° C., so that the air temperature in the annular space 28 is approximately equal to 900° C., and the mass flow is approximately equal to 180 g per second, which corresponds to a volume flow of approximately 650 liters per second. Through the use of corresponding flow guiding in the individual high-temperature fuel cells, which is explained further below in regard to FIG. 3, the pressure difference between the annular space 28 and the central space 16 is limited to only approximately 5 mbar. This low pressure drop makes it possible to use simple labyrinth baffles or plates 18, 24 for sealing off the central space 16 from the annular space 28. Since the air 36 which is introduced into the air jet pump 32 has already been compressed in the cold state, the power demand of the compressor required for this is so low that a total leakage cross section in the exemplary embodiment of approximately 60 cm$^2$ is inconsequential, and in particular constitutes only approximately 2% of the total cross section of the air guide channels in the non-illustrated bipolar plates of the high-temperature fuel cells that are not further represented in FIG. 1. Molecular oxygen in the air/exit-air mixture 22, 36 which is at a temperature of approximately 900° C. and flows into the fuel cells, is converted into oxygen ions at the cathodes of the high-temperature fuel cells. The electrons required for this are liberated at the anodes of the high-temperature fuel cells by oxidation of the hydrogen gas which is contained in the gas mixture 44 and has, on average, a total volume flow of 80 liters per second. The electrons liberated at the anodes flow to the cathodes through a non-illustrated external circuit, with the oxygen ions flowing through an electrolyte that conducts oxygen ions which is disposed between the anode and the cathode, and form water on the anode side with the hydrogen ions. This product water is discharged together with unconsumed hydrogen gas out of the container 2 through the exit gas line 42 as anode exit gas 46. Since the anode gas 46 is fed in pipes with a relatively small cross section, the pressure drop on the anode side is approximately 50 mbar. However, this pressure drop is not considerable since the gas mixture 44 is not recirculated back into the fuel cells after approximately 80% of the fuel gas is used up, but instead is subsequently combusted, which is further explained below with reference to FIG. 4.

Atmospheric oxygen that is not consumed in the fuel cells flows together with inert components of the air 36, as exit air 22, into the central space 16. As already described, a part of this exit air 22, namely approximately 120 g per second, is recirculated into the annular space 28 through the use of the air jet pump 32. The remaining exit air 22 is discharged with a mass flow of 60 g per second through the exit air pipe 20 and, it is subsequently combined with the anode exit gas 46 and it is combusted.

The section which is represented in FIG. 2 and is taken along the line II—II in FIG. 1 again clarifies the way in which the fuel cell stacks 4 to 14 form part of a partition which separates the central space 16 from the annular space 28. In this case the number of fuel cell stacks 4 to 14 directly adjoining one another in gas-tight fashion, can be freely selected within wide limits as a function of the desired power of the high-temperature fuel cell system 1.

Figure 3:
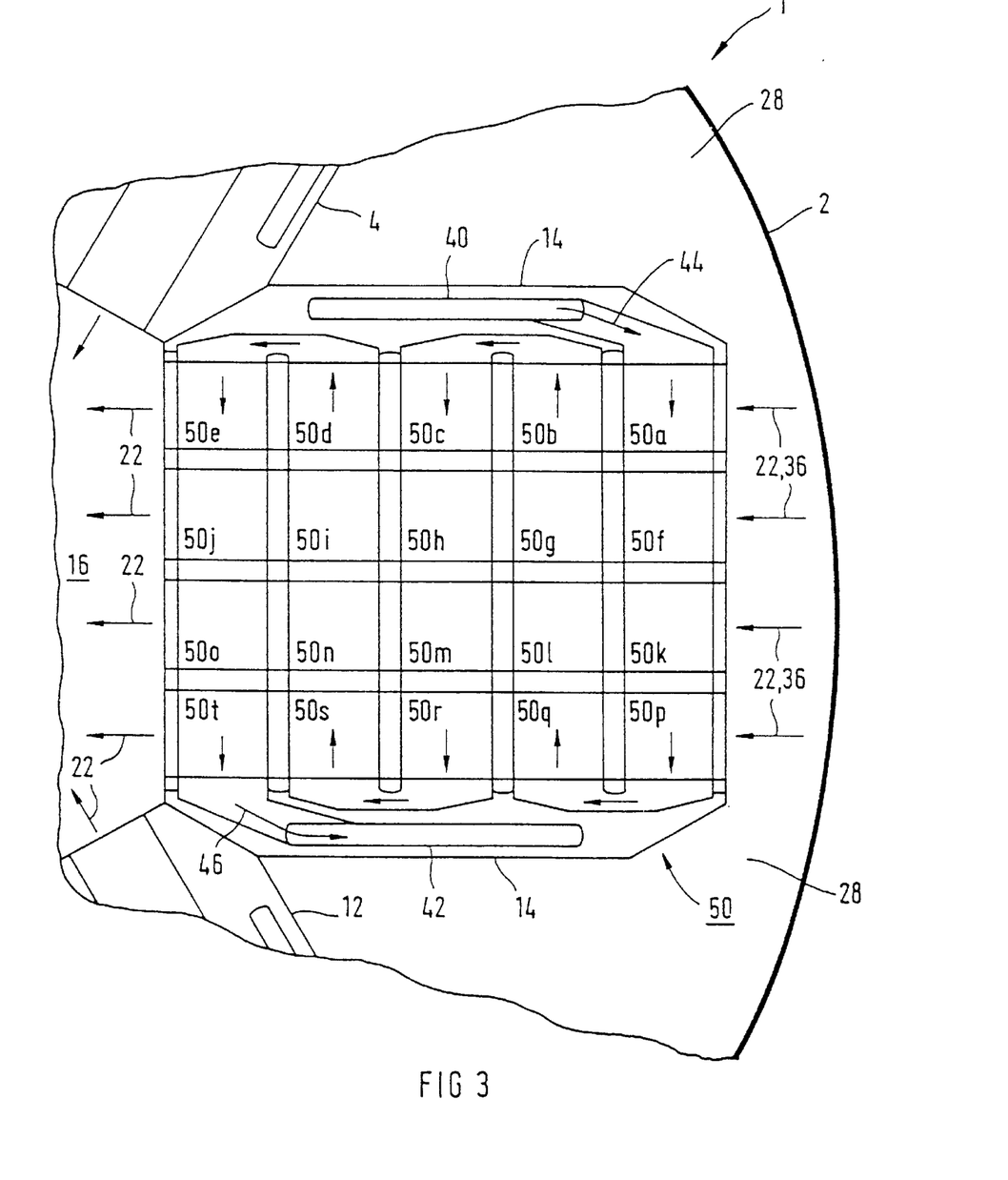
FIG. 3 is a fragmentary, enlarged view of a portion III of FIG. 2.

FIG. 3 represents the portion III shown in FIG. 2, on an enlarged scale. By way of example, the diagrammatic representation of this portion III shows the structure of a plane 50, being formed of 20 high-temperature fuel cells 50a to 50t with a size of approximately 5×5 mm each. The high-temperature fuel cells 50a to 50t are disposed in matrix fashion, in four rows and five columns. On the cathode side, which is to say on the air side, flow takes place in the plane 50 through four parallel channels, each having five fuel cells connected in series. Specifically, these are the channels for the high-temperature fuel cells 50a to 50e, 50f to 50j, 50k to 50o and 50p to 50t. On the anode side, which is to say on the hydrogen gas side, the gas mixture 44 is guided in crossed cocurrent flow with respect to the exit-air/air mixture 22, 36, and specifically, in sequence, through the high-temperature fuel cells 50a, f, k, p, q, l, g, b, c, h, m, r, s, n, i, d, e, j, o, t. It is, however, also equally conceivable to guide the reactants in crossed countercurrent flow, which would mean that, for example, the gas mixture 44 would flow in exactly the opposite direction from that represented in FIG. 3.

Advantageously, the composition of the anodes and the cathodes and the way in which they are coated with catalysts may be different on high-temperature fuel cells connected in series in the flow direction, so that internal reforming of the natural gas present in the gas mixture 44 does not take place too suddenly and with excessive local overcooling, with the result that thermal stresses can be avoided in the individual planes. Specifically, this may mean that, for example, the concentration of catalysts on the surface of the anode increases in the direction of flow of the gas mixture 44. With the aid of FIG. 3 it is once again explicitly shown that the non-illustrated air channels in the bipolar plates start in the annular space 28 and end in the central space 16 having a cylindrical configuration (see the cylindrical reactor container 2). In this way, the pressure drop when distributing the exit-air/air mixture 22, 36 and when collecting the exit air 22 is very small in each case. As a result, the power demand for the air compressor is particularly low, which is in contrast to the heretofore customary compressor powers of high-temperature fuel cell systems in which the exit air 22 and the air 36 is discharged from and fed to the high-temperature fuel cell stacks through a multiplicity of pipes.

Figure 4:
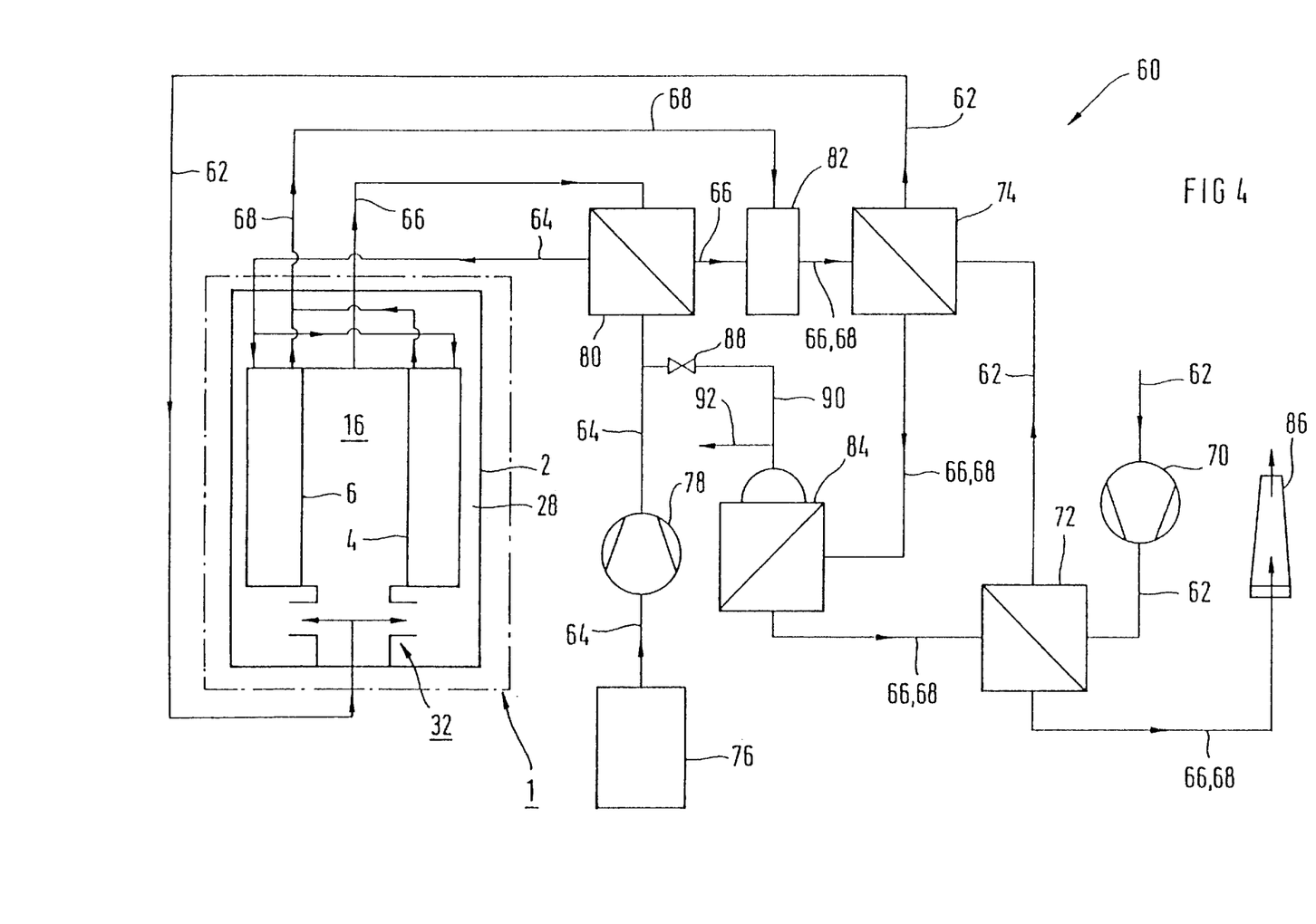
FIG. 4 is a diagrammatic and schematic view of the high-temperature fuel cell system according to FIG. 1 being integrated in a combined heat and power plant.

FIG. 4 schematically represents the way in which the high-temperature fuel cell system 1 according to FIGS. 1 to 3 is integrated into a combined heat and power plant 60. The description of FIG. 4 essentially deals with an air supply section 62, a fuel supply section 64, an exit air section 66 and an exit gas section 68. Arrows drawn in the flow sections 62 to 68 in FIG. 4 indicate the flow direction of the respective flow medium.

An induced-draft fan 70, a secondary side of a first air preheater 72, a secondary side of a second air preheater 74 and the air jet pump 32, are built-in in sequence in the air supply section 62. Starting from a natural gas storage 76, an induced-draft fan 78 and a secondary side of a preformer 80, are built-in in the fuel supply section 64. The exit air section 66 begins at the central space 16 and extends through a primary side of the preformer 80 to a burner 82. The exit gas section 68 starts from the high-temperature fuel cell stacks 4, 6 and opens directly into the burner 82. From the burner 82, the exit gas section 68 and the exit air section 66 extend together, in sequence, through a primary side of the second air preheater 74, a primary side of a steam generator 84, a primary side of the first air preheater 72 and finally into a chimney 86. Starting from a secondary side of the steam generator 84, a steam supply line 90 extends through a valve 88 and opens into the fuel supply section 64, which more specifically extends between the induced-draft fan 78 and the secondary side of the prereformer 80, in the flow direction of the natural gas. In addition, a steam output coupling device 92 which leads to a non-illustrated power-generation turbine is furthermore connected to the steam supply line 90.

During operation of the combined heat and power plant 60 having a high-temperature fuel cell system 1 with an electrical power of approximately 100 kW, hot air at a temperature of approximately 700° C. is fed with a mass flow of approximately 60 g per second, virtually without the use of pressure, to the air jet pump 32. In this case, the air is delivered through the air supply section with the aid of the induced-draft fan and is heated to that temperature on the secondary sides of the first and second air heaters 72, 74. In addition, natural gas which is at a temperature of approximately 1000° C. and is withdrawn from the natural gas storage 76 is supplied to the high-temperature fuel cell system 1 with the aid of the induced-draft fan 78. The temperature of the natural gas is set on the secondary side of the prereformer 80. In this case, approximately one half of the natural gas is also prereformed. By introducing steam in the natural gas through the steam supply line 90 and the valve 88, any formation of soot is avoided as a result of the reforming of the natural gas in the preformer 80 and because of the high temperatures.

The already described combustion reaction then takes place with consumption of atmospheric oxygen and hydrogen in the high-temperature fuel cell system 1. In this case the mass flow on the air side in the annular space 28 is approximately equal to 180 g per second. Approximately 120 g per second of the air situated in the central space 16 is recirculated with the aid of the air jet pump 32 into the annular space 28 and thereby into the high-temperature fuel cell stacks 4, 6. Approximately 80% of the natural gas is consumed in the high-temperature fuel cell system 1 and introduced into the burner 82 through the exit gas section 68. The air which is still situated in the central space 16 is likewise introduced into the burner 82 through the exit air section 66 and through the primary side of the prereformer 80, with the heat content of the exit air being advantageously used for prereforming of the natural gas.

In the burner 82, the hydrogen molecules and carbon molecules that are still contained in the gas mixture 44 are combusted together with the oxygen which is still contained in the exit air 22. The heat content of the burner exit gas in the exit-air/exit-gas section 66, 68 is first partially transferred in the second air preheater 74 to the supplied air for the purpose of preheating, then used to generate steam in the steam generator 84, and subsequently used in the first air preheater 72 for initial temperature elevation of the air supplied to the high-temperature fuel cell system 1. The extensively cooled burner exit gas is subsequently guided into the atmosphere through the chimney 86.

Figure 5:
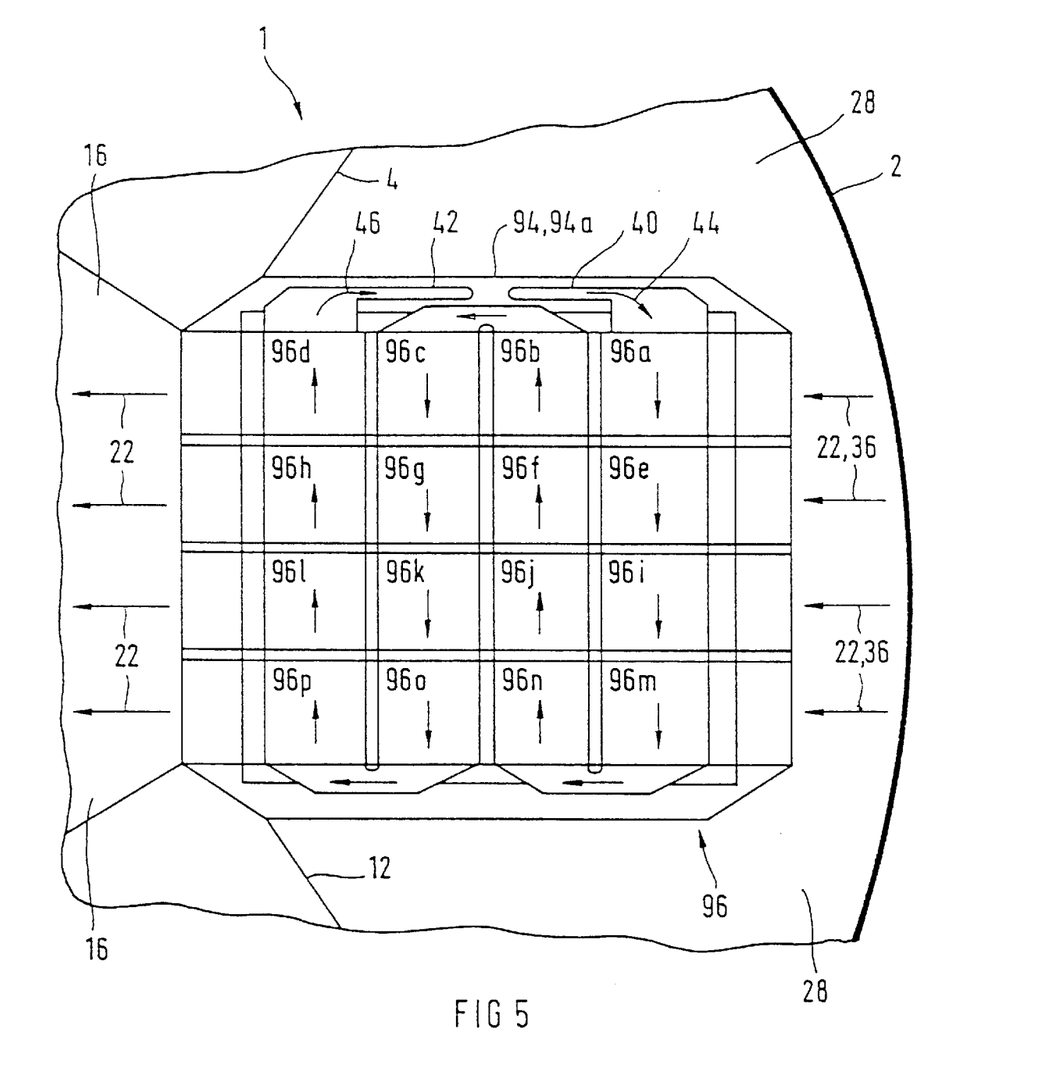
FIG. 5 is a fragmentary, enlarged view of the portion III of FIG. 2, which is taken along the line V—V in FIG. 6, with a high-temperature fuel cell stack constructed of partial stacks.
Figure 6:
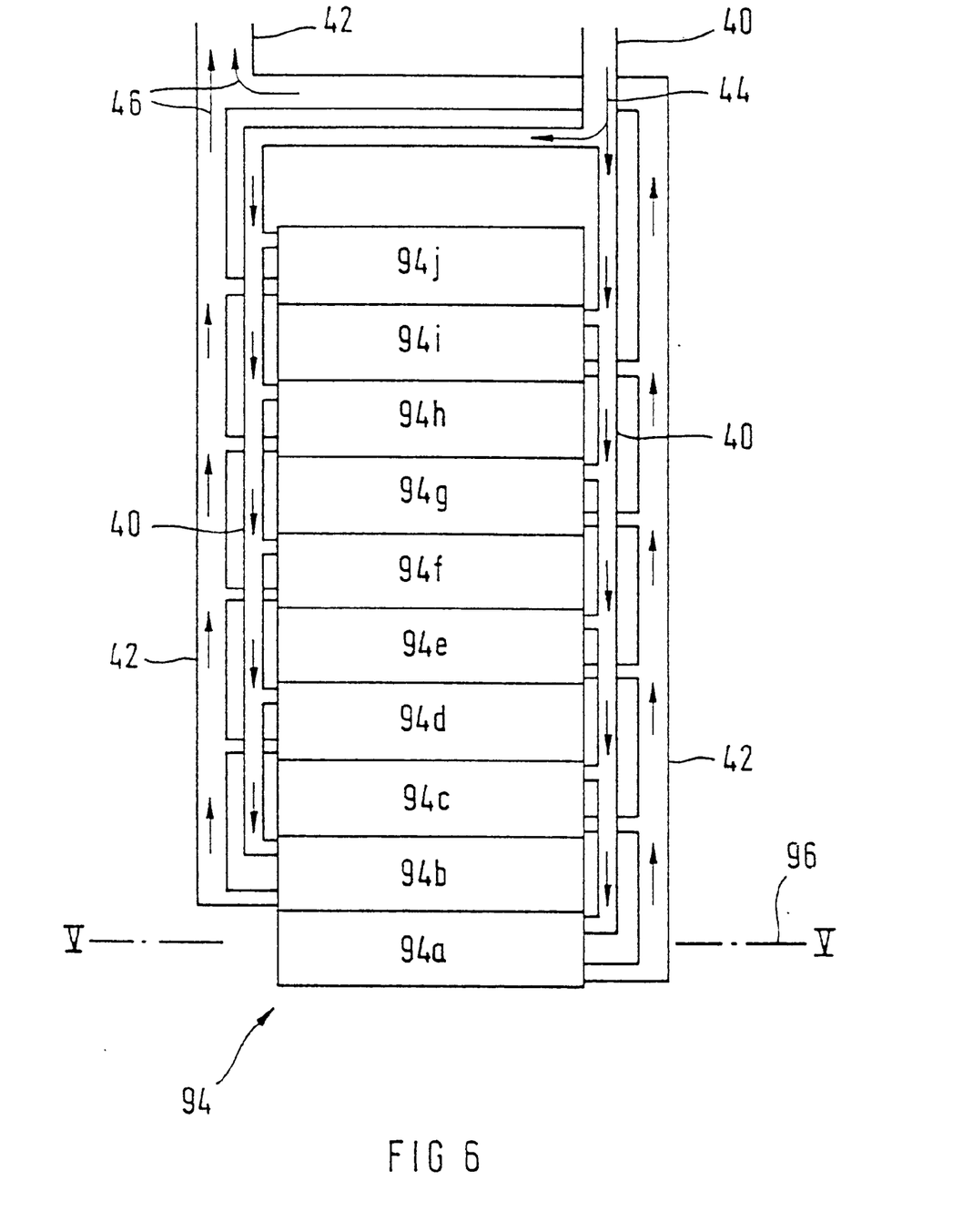
FIG. 6 is a fragmentary view of the high-temperature fuel cell stack constructed of partial stacks, as shown in FIG. 5.

FIG. 5 again represents the portion III shown in FIG. 3. In contrast to FIG. 3, however, the fuel cell stack 14 is replaced by a fuel cell stack 94 which is formed of 10 partial stacks 94a to 94j that are disposed one on top of the other as is seen in FIG. 6. Sixteen high-temperature fuel cells 96a to 96p are then disposed in a plane 96 of the high-temperature fuel cell stack 94. As in the case of the fuel cell stacks 50a to 50t in FIG. 3, the exit-air/air mixture 22, 36 and the gas mixture 44 that essentially contains hydrogen, flow through these high-temperature fuel cells 96a to 96p in crossed cocurrent flow. On the cathode side, which is to say on the air side, flow takes place in the plane 96 through four parallel channels, each having four high-temperature fuel cells connected in series. Specifically, these are the channels for the high-temperature fuel cells 96a to 96d, 96e to 96h, 96i to 96l and 96m to 96p. On the anode side, which is to say on the hydrogen gas side, the gas mixture 44 is guided in crossed cocurrent flow with respect to the exit-air/air mixture 22, 36 and specifically, in sequence, through the high-temperature fuel cells 96a, e, i, m, n, j, f, b, c, g, k, o, p, l, h, d.

This structure of the plane 96 makes it possible to guide the fuel supply line 40 and the exit gas line 42 on the same side of the partial stack 94a. As FIG. 6 illustrates, the partial stacks 94a to 94j are alternately connected to the fuel supply line 40 and the exit gas line 42 on opposite sides. In this way it becomes particularly simple to remove a defective partial stack from the high-temperature fuel cell stack 94.

In addition, it is considerably simpler to produce a relatively small partial stack 94a to 94j than to produce a single large stack. This is because, in particular during welding of the individual fuel cells to form a fixed stack, non-negligible gravitational force effects act as a result of the weight of the high-temperature fuel cells which are stacked one on top of the other. Operation of a high-temperature fuel cell system 1 with the partial stacks shown in FIGS. 5 and 6 is also more secure as compared to the fuel cell stacks 4 to 14 being formed of a single unit. This is because, in the event of leaks, local burning of oxygen and hydrogen remains limited to the relatively small region of a partial stack 94a to 94j.

The reactor variants with a power of 100 kW which are represented in the exemplary embodiments, can be increased straightforwardly up to 400 to 600 kW, even with an operation that is not driven by pressure, which is to say at atmospheric pressure. For this purpose, for example, the number of high-temperature fuel cell stacks 4 to 14, 94 that are disposed in a ring can be doubled from the six stacks in the exemplary embodiment to twelve stacks. In addition, a plurality of reactor containers 2 can be disposed one on top of the other.

We claim:

1. A high-temperature fuel cell system, comprising:
   a container having an air entry space and a single air exit space;
   a plurality of high-temperature fuel cell stacks disposed directly next to one another in a ring in said container forming at least part of a partition separating said air entry space and said air exit space from one another in said container, said high-temperature fuel cell stacks including high-temperature fuel cells having air inlets opening into said air entry space and air outlets opening into said air exit space, said air exit space located centrally in said ring; and
   said partition having at least one location for at least partially recirculating air in said air exit space into said air entry space with air flowing into said air entry space.

2. The high-temperature fuel cell system according to claim 1, including labyrinth baffles for at least one of partitioning and sealing.

3. The high-temperature fuel cell system according to claim 1, including an air jet pump for recirculating the air in the air exit space.

4. The high-temperature fuel cell system according to claim 3, including:
   a compressor for compressing air in a cold state; and
   a first and second preheater connected in series for preheating the air, said first preheater receiving air from said compressor and said second preheater supply air to said air jet pump.

5. The high-temperature fuel cell system according to claim 3, wherein said air jet pump is disposed centrally in said air exit space and blows toward said air entry space.

6. The high-temperature fuel cell system according to claim 1, wherein said high-temperature fuel cell stacks have a plurality of said high-temperature fuel cells and a plurality of planes disposed on top of each other and containing said high-temperature fuel cells, said high-temperature fuel cells being disposed perpendicular to each other in said planes for conducting a fuel gas and air flow through said high-temperature fuel cells in crossed cocurrent flow.

7. The high-temperature fuel cell system according to claim 1, wherein said high-temperature fuel cell stacks are subdivided into a plurality of partial stacks disposed one on top of the other.

8. The high-temperature fuel cell system according to claim 1, wherein said high-temperature fuel cells are connected in series in a flow direction and each of said high-temperature fuel cells has a cathode and an anode, at least two of said high-temperature fuel cells have anodes formed of different compositions.

9. The high-temperature fuel cell system according to claim 1, wherein each of said high-temperature fuel cells has a cathode and an anode with a coating of catalytic material and said high-temperature fuel cells are connected in series in a flow direction, said coating on said anode of at least two of said high-temperature fuel cells are different.

10. The high-temperature fuel cell system according to claim 1, including a preformer for receiving air not being recirculated out of said air exit space and into said air entry space for at least partially pre-reforming fuel gas received in said preformer.

* * * * *